United States Patent
Rae

(10) Patent No.: US 8,243,896 B1
(45) Date of Patent: *Aug. 14, 2012

(54) SELECTION OF A PARTICULAR COMMUNICATION CARRIER FROM A PLURALITY OF COMMUNICATION CARRIERS IN A SECURE ENVIRONMENT

(75) Inventor: Robert L. Rae, Plano, TX (US)

(73) Assignee: Securus Technologies, Inc., Dallas, TX (US)

( * ) Notice: Subject to any disclaimer, the term of this patent is extended or adjusted under 35 U.S.C. 154(b) by 1482 days.

This patent is subject to a terminal disclaimer.

(21) Appl. No.: 11/753,421

(22) Filed: May 24, 2007

(51) Int. Cl.
*H04M 3/00* (2006.01)

(52) U.S. Cl. .............. 379/188; 379/32.01; 379/114.02; 379/114.1; 379/114.15; 379/114.2; 379/114.21

(58) Field of Classification Search .............. 379/188, 379/189, 221.02, 32.01, 114.02, 114.1, 114.15, 379/114.2, 114.21
See application file for complete search history.

(56) References Cited

U.S. PATENT DOCUMENTS

2006/0245559 A1* 11/2006 Hodge et al. ............... 379/88.19
2007/0003049 A1* 1/2007 Florkey et al. ............... 379/230

OTHER PUBLICATIONS

U.S. Appl. No. 10/135,878, Viola et al.
U.S. Appl. No. 10/360,442, Falcone et al.
U.S. Appl. No. 10/642,532, Robert L. Rae.
U.S. Appl. No. 11/386,032, Falcone.
U.S. Appl. No. 11/562,829, Kelson et al.

* cited by examiner

*Primary Examiner* — Antim Shah
(74) *Attorney, Agent, or Firm* — Fogarty, L.L.C.

(57) ABSTRACT

Systems and methods which facilitate selection of communication carriers for communications made in association with a controlled environment facility by a party to the communications are shown. Embodiments allow for a calling party and/or a called party to select a preferred communication carrier from a plurality of communication carriers for a current communication and/or one or more future communications. A party's carrier selection may be stored by a communication processing system for use with respect to a plurality of communication sessions. Embodiments provide a conflict resolution algorithm to arbitrate conflicting carrier selections where both a calling party and a called party to select a carrier for a communication session. Embodiments provide a premise based communication processing system, a centralized communication processing system, or a distributed configuration comprising a hybrid of the foregoing premise based and centralized configurations.

12 Claims, 4 Drawing Sheets

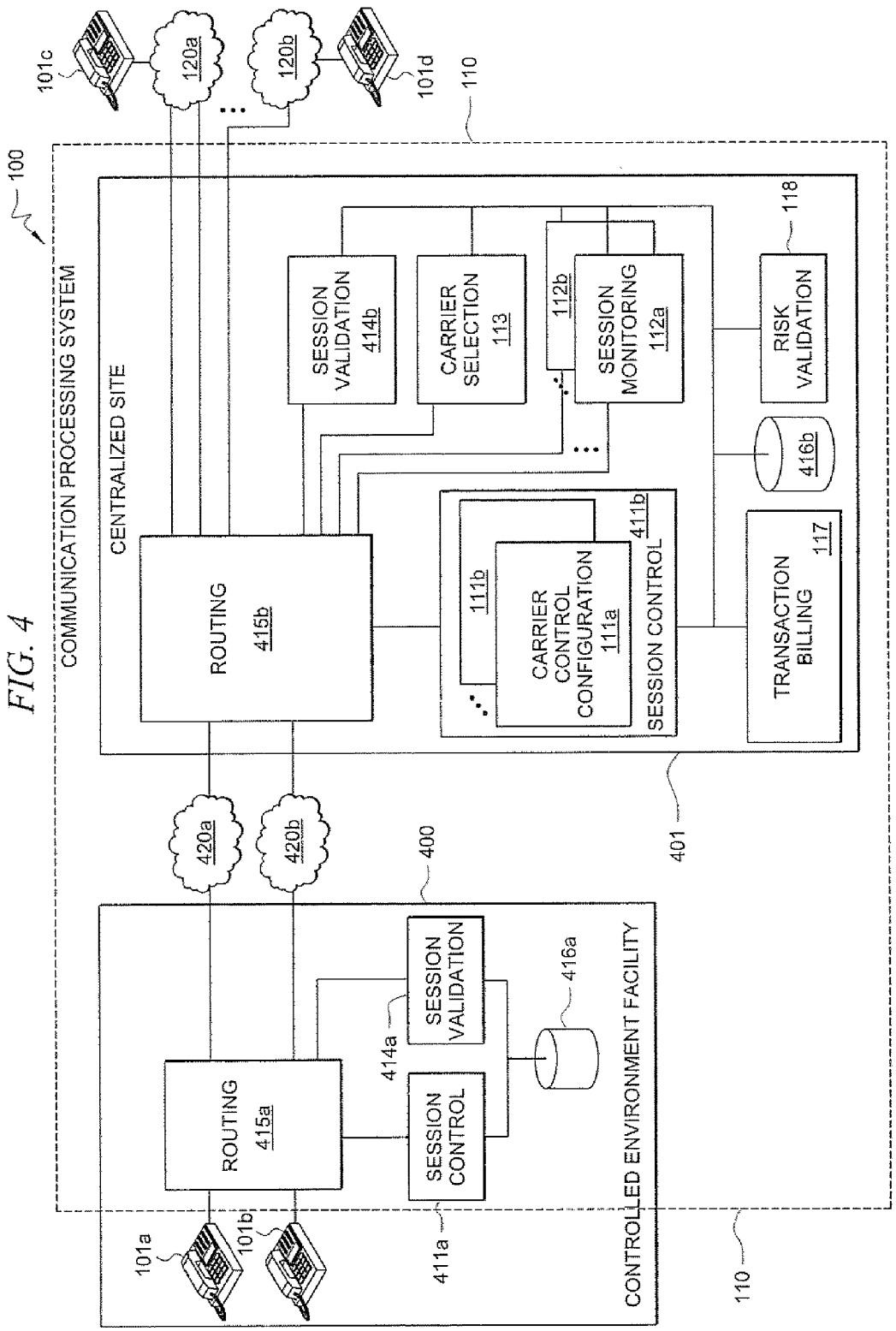

SELECTION OF A PARTICULAR COMMUNICATION CARRIER FROM A PLURALITY OF COMMUNICATION CARRIERS IN A SECURE ENVIRONMENT

CROSS-REFERENCE TO RELATED APPLICATIONS

The present application is related to co-pending and commonly assigned U.S. patent application Ser. No. 10/135,878 entitled "Information Management and Movement System and Method," filed Apr. 29, 2002, Ser. No. 11/562,829 entitled "Optimizing Profitability in Business Transactions," filed Nov. 22, 2006, Ser. No. 11/386,032 entitled "System and Method for Account Establishment and Transaction Management Using Interrupt Messaging," filed Mar. 21, 2006, Ser. No. 10/360,442 entitled "Systems and Methods for Transaction Authorization Determination," filed Feb. 7, 2003, and Ser. No. 10/642,532 entitled "Centralized Call Processing," filed Aug. 15, 2003, the disclosures of which are hereby incorporated herein by reference.

TECHNICAL FIELD

The invention relates generally to controlled environment communications and, more particularly, to providing choice of carriers with respect to controlled environment communications.

BACKGROUND OF THE INVENTION

A segment of the communications services marketplace has developed around providing telecommunication services to certain facilities where individuals have restricted or controlled access to the telecommunication network. Accordingly, a telecommunications company may deploy a call processing system providing calling services to an inmate facility (e.g., jail, prison, penitentiary, stockade, etcetera) or other controlled environment facility (e.g., camp, nursing home, school, hospital, etcetera), wherein use of the telecommunications network by residents of the controlled environment facility is tightly controlled by the call processing system. For example, calling services from an inmate facility may comprise a prisoner privilege which is closely regulated and monitored, such as to prevent harassing phone calls, fraud, and the commission of crimes. Accordingly, telecommunications providers providing controlled environment facility calling services may be required to provide various call control and/or monitoring features, such as calling party authorization, called party authorization, call forwarding detection, three-way call detection, call recording, word searching within the conversation, etcetera.

Such call control and monitoring features typically involve complex systems which are configured for a particular environment. Depending upon the particular carrier providing the telecommunications links, the particular communications utilized, etcetera, various parameters and other aspects of call control and monitoring features will often be adjusted to provide desired operation. For example, three-way call detection algorithms often require adjustment of line "silence" thresholds and/or hook flash algorithms in order to operate properly with respect to any particular carrier and environment (e.g., distance from central office, type of trunk lines used, physical interface employed, etcetera). Moreover, wholly different three-way call detection algorithms may be required as between situations where a carrier employing voice over Internet protocol (VoIP) and a carrier employing more traditional public switched telephone network (PSTN) links.

In addition to the need to deploy and configure such complex systems for call control and monitoring, telecommunications companies providing communications services to controlled environment facilities have significant overhead in maintaining not only the call control and monitoring systems but also data associated with the call processing system. For example, call recordings must typically not only be warehoused, but they must be accurately cataloged and secured in order to preserve their integrity for use in investigative or legal proceedings. Moreover, information such as inmate identification and rights, allowed numbers, disallowed numbers, etcetera must be constantly updated to ensure proper operation of the call processing system. In many controlled environment facilities, the call processing system itself, along with its call control and monitoring aspects, must be constantly refined in order to prevent continuous attempts by users to defeat the controls or to commit fraud.

Because of the burdensome infrastructure, management, and maintenance requirements associated with providing telecommunications services with respect to controlled environment facilities, a telecommunications company providing the aforementioned call processing system with respect to a particular facility has traditionally been provided a long term contract to provide the telecommunications services for that controlled environment facility. This has meant that the telecommunications company has been allowed to provide access only to a carrier of the telecommunications company's choice (e.g., the telecommunications company itself serves as the telecommunications carrier or the telecommunications company leases lines from a carrier for use in providing the services). Through controlling access to a selected carrier, the telecommunications company providing the calling services to the controlled environment facility is able to recover the costs of the infrastructure, management, and maintenance required in providing the services through toll or per-call charges which are somewhat increased over charges otherwise available on the open market.

Although telecommunications companies providing communications services to controlled environment facilities, wherein the above described call control and monitoring are employed, have themselves occasionally utilized two carriers to provide the calling services, they have heretofore not provided any means by which a user (whether a calling party or a called party) may select a particular carrier for communications services. That is, a telecommunications company may lease lines from two carriers in order to provide the telecommunications company itself an ability to complete calls using an appropriate one of the carriers. However, the number of such carriers used by a telecommunications company providing communication services to a controlled environment facility has been limited to a very few because, in the current model wherein the telecommunications company is the entity ultimately responsible for paying for the call, the telecommunications company must have agreements in place a priori with the carrier. Moreover, it is difficult to manage multiple carriers, such as to constantly ensure that all carriers are operating, that the carriers that are operating have enough capacity at any particular time to carry calls, etcetera.

Selection between the carriers by the telecommunications company between two carriers has been provided in only very limited situations. For example, a telecommunications company may, for a particular call, select between two carriers from which the telecommunications company has already leased lines based upon which carrier provides the lowest cost for carrying the call provided that the appropriate call control and monitoring systems needed for the call are operable with respect to the selected carrier.

BRIEF SUMMARY OF THE INVENTION

The present invention is directed to systems and methods which facilitate selection of communication carriers for communications made in association with a controlled environment facility by a party to the communications. Embodiments of the invention allow for a calling party and/or a called party to select a preferred communication carrier from a plurality of communication carriers for a current communication and/or one or more future communications. The plurality of communication carriers may comprise all communication carriers on a network or a subset of the communication carriers on a network according to embodiments of the invention.

To facilitate selection of a carrier by a user, embodiments of the invention implement one or more interfaces to allow indication of a carrier selection by a user. Such an interface may query a calling party and/or called party at the initiation of a communication session with respect to the party's preference of a carrier. Where the party is a calling party, the communication session may proceed to utilize the selected carrier to initiate the communication. Where the party is a called party, an initial communication session may be terminated in favor of a communication session using a selected carrier where the selected carrier is different than that of the initial communication session. Alternatively, the called party may be queried for a carrier selection via means different than those used in the communication session being initiated (e.g., the called party may be queried by e-mail or text message with respect to a desired carrier for a telephone call being initiated).

The foregoing interface may additionally or alternatively query a calling party and/or called party outside of initiation of a communication session (e.g., before and/or after a communication session). For example, a party may provide preferences with respect to a carrier choice before a communication session is ever initiated. Similarly, a party may provide a carrier selection for future communication sessions after a communication session has terminated.

A party's carrier selection may be stored by a communication processing system of the present invention for use with respect to a plurality of communication sessions. For example, once a particular party provides a carrier selection, further communications originated by and/or terminated with the party may utilize the selected carrier.

Because embodiments of the present invention provide for both a calling party and a called party to select a carrier for a communication session, embodiments of the invention include a conflict resolution algorithm to arbitrate conflicting carrier selections. For example, a calling party may select a first carrier, whereas a called party may have selected a second carrier. In such a situation, a preferred embodiment of the present invention determines the party financially responsible for the communication session or the party most likely to pay for the communication session and resolves the conflict by utilizing that party's selected carrier.

In order to facilitate desired operation with respect to a plurality of carriers, embodiments of the present invention provide call control and monitoring functionality adapted for use with a plurality of carriers. According to embodiments of the invention, multiple call control and/or monitoring systems may be provided, wherein ones of the call control and/or monitoring systems are configured for a particular corresponding carrier. Additionally or alternatively, call control and/or monitoring systems may be adapted to operate properly with respect to a plurality of carriers, such as through implementing different configuration parameters for particular corresponding carriers.

Because users are empowered to select carriers with which an entity providing a controlled environment communication processing system of the present invention (such entities being referred to herein as controlled environment communication service providers (CECSP)) has no prior relationship, embodiments of the invention provide risk or debt management services to carriers. For example, the selected carrier may be responsible for collecting funds in payment for the communication service (e.g., the billing model is shifted such that the CECSP receives a "connection fee," but is not considered the communication service provider for the communication session), although the selected carrier may have little information regarding the calling and/or called parties from which to make a credit worthiness determination. Systems of the present invention may operate to provide information regarding the likelihood of receiving payment, such as through a scoring system used with respect to information available through the communication processing system, to the selected carrier for use in determining if the carrier desires to carry the communication.

Embodiments of the invention provide a premise based communication processing system (i.e., disposed at a controlled environment facility for which communication processing services are provided) facilitating selection of communication carriers by users. Premise based communication processing systems of embodiments of the present invention provide session validation, carrier selection, and session control and monitoring functionality through a communication processing platform disposed at the controlled environment facility. It should be appreciated that the foregoing session validation, carrier selection, and session control functionality, although provided by a communication processing platform disposed at the controlled environment facility, may utilize information obtained from a database or other system (e.g., line information database (LIDS), billing telephone number (BTN) registry, etcetera) which is not disposed at the controlled environment facility.

Alternative embodiments of the invention provide a centralized communication processing system (e.g., disposed remotely with respect to one or more controlled environment facilities for which communication processing services are provided) facilitating selection of communication carriers by users. Centralized communication processing systems of embodiments of the present invention provide session validation, carrier selection, and session control and monitoring functionality through a communication processing platform disposed at one or more centralized sites which preferably provides communication processing services with respect to a plurality of controlled environment facilities. It should be appreciated that the foregoing session validation, carrier selection, and session control functionality, although provided by a communication processing platform disposed at centralized sites, may utilize information obtained from a database or other system which is not disposed at the centralized sites.

Embodiments of the invention provide a distributed configuration comprising a hybrid of the foregoing premise based and centralized configurations. Hybrid communication processing systems of embodiments of the present invention provide session validation through a communication processing platform disposed at the controlled environment facility and carrier selection through a communication processing platform disposed at one or more centralized sites which preferably provides communication processing services with respect to a plurality of controlled environment facilities. According to embodiments, session control and monitoring functionality may be provided by hybrid communication processing systems through a communication processing platform disposed at the controlled environment facility, the centralized sites, or combinations thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 shows a communication processing system of an embodiment of the present invention deployed in a hybrid configuration.

DETAILED DESCRIPTION OF THE INVENTION

Figure 1:
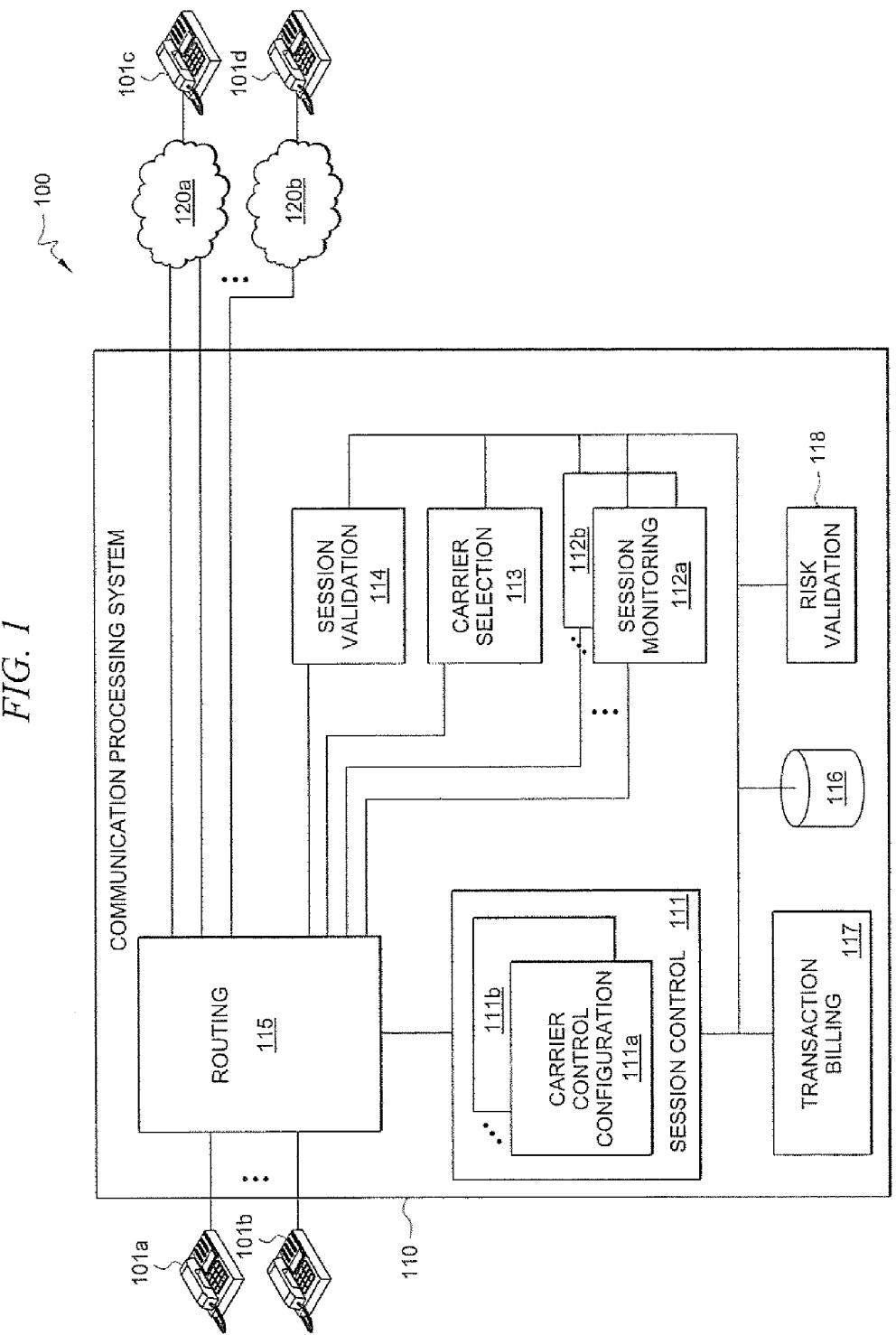
FIG. 1 shows a high level functional block diagram of communication system 100 adapted according to an embodiment of the present invention.

FIG. 1 shows a high level functional block diagram of communication system 100 adapted according to embodiments of the present invention. The embodiment of FIG. 1 includes communication processing system 110 disposed to provide communication services with respect to a controlled environment facility (not shown), such as an inmate facility, a camp, a nursing home, a school, a hospital, etcetera. Accordingly, in the illustrated embodiment, a plurality of user terminals (here user terminals 101a-101b) are disposed for use by residents of a controlled environment facility (e.g., inmates, patients, students, etcetera) and a plurality of user terminals (here user terminals 101c-101d) are disposed for use by non-residents of the controlled environment facility (e.g., friends and family, medical personnel, police, attorneys, bail bondsmen, instructors, etcetera). Communication processing system 110 of the illustrated embodiment operates to control communications made by and between user terminals 101a-101d.

In order to establish service at a controlled environment facility, a controlled environment communication service providers (CECSP) may interpose communication processing system 110 and/or the CECSP's network between the PSTN or other network and a resident (e.g., an inmate) in the controlled environment facility. The CECSP would typically provide its phone equipment and call processing for residents' calls through a network that interfaces over a high capacity line, such as a T1 line, broadband link, etcetera, with network 120a and/or 120b. Once on network 120a and/or 120b, the calls may ultimately terminated at the desired electronic address (e.g., telephone number) through the use of another service provider's lines and equipment, such as may be set up and connected by the use of the intelligent network elements (e.g., signaling system seven (SS7), Internet routers, etcetera). Thus, residents would be granted access to other calling companies networks through the CECSP network and communication processing system 110.

Communication processing systems of embodiments of the present invention may include various features aimed at providing specialized services that may be desirable in a controlled environment facility. These services may include call treatment measures such as increased security over the calls, caller identification, controlled access between network 120a and/or 120b and the controlled environment facility communication network, recording the residents communications, maintaining a database of all calls to and from the facility/residents, notifying the appropriate authorities about a communication in a timely manner, and account verification for transaction payment information. This listing of services is not meant to be exhaustive of all services that may be provided or requested. Detail with respect to providing general communication control in association with a controlled environment facility is provided in the above referenced patent applications entitled "Information Management and Movement System and Method," "System and Method for Account Establishment and Transaction Management Using Interrupt Messaging," "Systems and Methods for Transaction Authorization Determination," and "Centralized Call Processing."

Communication processing system 110 of the illustrated embodiment includes session control subsystem (shown here as session control 111), one or more session monitoring subsystem (shown here as session monitoring 112a-112b), a carrier selection subsystem (shown here as carrier selection 113), a session validation subsystem (shown here as session validation 114), a communication routing subsystem (shown here as routing 115), and one or more database subsystem (shown here as database 116). In operation according to embodiments of the present invention, routing 115 provides links between selected ones of user terminals 101a-101d and other ones of user terminals 101a-101d and/or subsystems of communication processing system 110 under control of session control 111. Session control 111 preferably provides control of routing 115 responsive to information provided by session monitoring 112a-112b, carrier selection 113, and/or session validation 114. Communication processing system 110 of the illustrated embodiment further includes a transaction billing subsystem (shown here as transaction billing 117) providing billing for services provided using communication processing system 110 and a risk validation subsystem (shown here as risk validation 118) providing analysis of revenue collection risk associated with services provided using communication processing system 110.

In order to provide desired operation with respect to a plurality of different communication carriers, such as may have different networks, communication protocols, communication attributes, etcetera associated therewith, the illustrated embodiment of communication processing system 110 includes a plurality of carrier control configurations (shown here as carrier control configuration 111a-111b) as well as a plurality of session monitoring systems (session monitoring 112a-112b). It should be appreciated that the number of carrier control configurations 111a-111b and/or session monitoring 112a-112b may be large, and perhaps not directly related to the number of communication carriers available for selection according to embodiments of the invention. For example, a different carrier control configuration and/or session monitoring may be provided for each communication carrier that may be selected or a different carrier control configuration and/or session monitoring may be provided for groups of communication carriers (e.g., communication carriers using a same media, communication carriers using a same protocol, etcetera). Moreover, a different carrier control configuration and/or session monitoring may be provided for each of a plurality of features available with respect to an associated communication carrier or group of communication carriers.

Communication processing system 110 of embodiments of the invention may be implemented as a general purpose computer, such as may comprise a microprocessor, memory, and various input/output devices, operating under control of an instruction set defining operation as described herein. Accordingly, one or more of the above mentioned subsystems may be provided, at least in part, as a software module operable upon a general purpose computer. The foregoing general purpose computer may utilize various expansion boards and/or adaptors, such as telephone line cards, voice cards, etcetera, whether external or internal thereto, as are well known in the art in order to provide functionality as described herein. Accordingly, one or more of the above mentioned subsystems may be provided, at least in part, as a hardware module operable with respect to a general purpose computer. Additionally or alternatively, embodiments of the present invention may utilize special purpose circuitry, such as application specific integrated circuits, special purpose computer systems, etcetera, in providing communication system 110.

As will better be appreciated from the discussion which follows, communication processing system 110 may be provided in a plurality of configurations. For example, communication processing system 110 may be provided in a premise based or localized configuration, a centralized configuration, or a hybrid configuration which utilizes aspects of both localized and centralized configurations.

In operation according to the present invention, communication processing system 110 facilitates selection of communication carriers for communications made in association with a controlled environment facility by a party to the communications. Accordingly, users of communication processing system 110 are enabled to select from a plurality of carriers, such as may provide communications services using one or more networks. For example, a first plurality of carriers from which a user may select a particular carrier for one or more communication sessions may provide communication services using network 120a, such as may comprise the public switched telephone network (PSTN). A second plurality of carriers from which a user may select a particular carrier for one or more communication sessions may provide communication services using network 120b, such as may comprise a packet network (e.g., the Internet, a local area network (LAN), a metropolitan area network (MAN), a wide area network (WAN), a cable transmission system, a wireless network, etcetera). Accordingly, a user may not only be empowered to select a particular carrier with respect to communication services, but may further be empowered to select a communication network (e.g., PSTN or packet) and/or communication protocol (e.g., plane old telephone service (POTS) or voice over Internet protocol (VoIP)).

Embodiments of the invention allow for various users, such as a calling party and/or a called party, to select a preferred communication carrier from a plurality of communication carriers. The plurality of communication carriers may comprise all communication carriers on a network or a subset of the communication carriers on a network according to embodiments of the invention. For example, a CECSP deploying communication processing system 110 may determine that particular communication carriers provide services compatible with call control and monitoring, or other aspects associated with providing calling services to the controlled environment facility, and thus allow for selection as between these communication carriers, such as by disallowing selection of communication carriers not identified in a selectable carriers database. Alternatively, communication processing system 110 may provide for selection of any available communication carrier.

To facilitate selection of a carrier by a user, communication processing system 110 of an embodiment of the invention implements one or more interfaces to allow indication of a carrier selection by a user. For example, a resident of the controlled environment facility may wish to communication with a non-resident of the controlled environment facility and thus utilizes user terminal 101a in an attempt to establish a communication session with a particular non-resident. Upon attempting to initiate a communication session using user terminal 101a, routing 115 preferably operates under control of session control in order to place user terminal 101a in communication with various subsystems of communication processing system 110 and/or selected ones of user terminals 101b-101d, as may be provided through select ones of networks 120a-120b. In addition to providing the foregoing, control of routing 115, session control 111 of embodiments may provide an interface to a user of user terminal 101a for facilitating the desired communications.

For initiation of a communication session, either by or to a resident of the controlled environment facility, an interaction with communication processing system 110 preferably takes place, wherein the appropriate communication treatment measures are determined. It should be understood that various levels of security and communication treatment measures may be invoked for different residents and/or different facilities. As an example, the process may start with a resident accessing the CECSP network by trying to place a call at one of user terminals 101a-101b located at various locations in the controlled environment facility and designated for use by the inmates to make calls. The call may begin with the inmate identifying him/herself through the use of a personal identification number, password, or some other means of identification whereby the CECSP can verify the identify of the inmate for use in further call verification procedure.

In operation according to a preferred embodiment, session validation is preferably provided by verifying that the calling party has privileges to initiate the communication session, that the electronic address is an address to which communications are permitted, that the called party is allowed to receive communications from the called party, and/or the like. For example, session control 111 may control routing 115 to establish a link between user terminal 101a and session validation 114 in order to solicit information for session validation. Alternatively, session control 111 may interact with session validation 114 in order to solicit information for session validation. Accordingly, session control 111 and/or session validation 114 may provide an interface, such as an interactive voice response (IVR) interface, for obtaining information such as the user's identification (e.g., personal identification number (PIN), biometric data, etcetera), type of communication desired (e.g., telephone call, short message service (SMS) session, electronic mail session, video conference session, etcetera), and electronic address (e.g., telephone number, electronic mail address, Internet protocol address, integrated services digital network (ISDN) address, etcetera) of the called party. In providing session validation, session control 111 and/or session validation 114 may access one or more databases, such as database 116 and/or databases external to communication processing system 110 (not shown), to obtain information with respect to the calling party, the called party, the electronic address, etcetera, and session control 111 may utilize this information to make a communication session validation determination.

If it is determined during session validation that the communication session is not permitted, session control 111 of a preferred embodiment controls routing 115 to prevent user terminal 101*a* from completing initiation of the communication session. Accordingly, the foregoing interface may provide interaction in addition to soliciting information for use in validating the communication session. For example, the interface may operate to provide information with respect to why the communication session is not being permitted, what action may be taken to initiate communication sessions in the future, etcetera.

The foregoing session validation provides safety and security with respect to the controlled environment facility, such as through preventing harassing phone calls, fraud, and the commission of crimes. Further detail with respect to providing communication session validation is provided in the above patent applications entitled "Information Management and Movement System and Method" and "Centralized Call Processing."

Assuming the communication session validation is affirmative in the illustrative example, the user interface may proceed to query the calling party as to the calling party's preference of a communication carrier to be used with respect to the communication session. For example, session control 111 may control routing 115 to establish a link between user terminal 101*a* and carrier selection 113 in order to solicit a carrier selection from the calling party. Alternatively, session control 111 may interact with carrier selection 113 in order to solicit a carrier selection from the calling party. Accordingly, session control 111 and/or carrier selection 113 may provide an interface, such as an IVR interface, for obtaining the user's selection of a communication carrier. It should be appreciated that the foregoing interface may provide interaction in addition to soliciting a choice of carrier. For example, the interface may provide information with respect to the various carriers available for selection, the differences in service, price, etcetera between the various carriers, and/or the like, such as to solicit a more informed choice from the user.

Embodiments of the present invention may obtain a party's selection of a carrier without overtly querying the user. For example, the aforementioned electronic address may include data indicative of the user's communication carrier selection. According to one embodiment of the invention, a user may provide a "1010" dialing code, as is utilized on the PSTN for long distance carrier selection, when providing the aforementioned electronic address information. Session control 111 of an embodiment of the invention parses this embedded information and provides it to carrier selection 113 for selection of the carrier.

In operation according to a preferred embodiment, session control 111 and/or carrier selection 113 operate to verify that a selected carrier is an acceptable carrier for the communication session. For example, one or more database may be queried to determine if the carrier provides the type of communication session sought to be initiated, that the carrier's network is currently operating, that there is sufficient capacity in the carrier's network, that the various call control features of communication processing system 110 to be utilized with respect to the communication session are available for operation with respect to the carrier, etcetera.

Assuming the selected carrier is determined to be an acceptable carrier, session control 111 preferably controls routing 115 to establish a link between a user terminal associated with the electronic address and user terminal 101*a* through links of the selected carrier. However, where the selected carrier is determined to be inappropriate for the communication session, session control 111 and/or carrier selection 113 may operate to obtain another carrier selection from the user or terminate the communication session attempt.

It should be appreciated that in facilitating completing the requested communication using the selected communication carrier, routing 115 may provide communication information to an appropriate one of network 120*a* and/or 120*b* to cause a communication link to be established. For example, SS7 signaling information may be provided to cause a link to a called party's electronic address to be established. Additionally or alternatively, in-band signaling, such as using dual tone multiple frequency (DTMF), may be used to initiate a desired link (e.g., routing 115 providing "1010" long distance carrier selection dialing to robotically implement communication carrier selection over the PSTN.

Communication information provided by communication processing system 110 of embodiments is not limited to information directly used in establishing a desired link. For example, various ancillary information, such as business decision information, may be provided in addition to or in the alternative to information which is directly utilized for establishing a desired communication session. Embodiments of the invention provide information identifying the communication as being associated with a controlled environment facility, or resident thereof, in order for a selected communication carrier to make appropriate risk and/or security assessments. Additionally or alternatively, embodiments of the invention provide risk assessment information, such as a risk score shown and described in the above referenced patent application entitled "Optimizing Profitability in Business Transactions," to aid the selected communication carrier in determining if the requested communication link is to be provided, a fee structure for providing the requested communication service, etcetera.

Preferred embodiments of the present invention operate to store information with respect to the communication carrier selected for use beyond establishing the communication session. For example, information with respect to the selected carrier may be stored in database 116 for implementing session control and/or session monitoring during the communication session. Embodiments of the invention operate to provide communication session monitoring, such as to detect unauthorized activity (e.g., three-way call attempts, call forwarding attempts, substitution of parties to the communication, communication of prohibited information, words, or phrases, etcetera). Accordingly, in addition to controlling routing 115 to establish a link between a user terminal associated with the electronic address and user terminal 101a, session control 111 may control routing 115 to place an appropriate one of session monitoring 112a-112b in communication with the communication session for monitoring. The appropriate one of session monitoring 112a-112b is preferably selected based upon the particular communication carrier selected to provide the communication session. For example, session monitoring 112a may be configured for operation with a first communication carrier (or a first subset of communication carriers), whereas session monitoring 112b may be configured for operation with a second communication carrier (or a second subset of communication carriers).

The appropriate one of session monitoring 112a-112b may provide reliable monitoring of the communication session and provide information with respect to the communication session to session control 111. Where the information indicates action is to be taken, such as to terminate the communication session, play an announcement, rerouting the communication session, coupling additional resources to the communication session, etcetera, session control 111 preferably controls routing 115 and/or other subsystems of communication processing system 110 to take the appropriate action. In order to accurately determine the appropriate action and/or to implement the appropriate action, session control 111 of the illustrated embodiment utilizes an appropriate one of carrier control configuration 111a-111b, such as may be determined by referencing the selected communication carrier information in database 116.

As can be appreciated from the above, in order to facilitate desired operation with respect to a plurality of communication carriers, embodiments of the present invention provide call control and monitoring functionality adapted for use with a plurality of carriers. According to the illustrated embodiment, carrier control configuration 111a-111b and session monitoring 112a-112b are provided, wherein ones of the carrier control configurations and session monitoring subsystems are configured for a particular corresponding carrier or carriers.

Although the foregoing example of obtaining a user's selection of communication carrier for a communication session was directed to a calling party, it should be appreciated that embodiments of the present invention additionally or alternatively enable a called party to select the communication carrier. For example, upon initially establishing a communication session with the called party, session control 111 and/or carrier selection 113 may operate to obtain and store a carrier selection from the called party in a manor consistent with that described above with respect to the calling party. Because an initial communication session may already have been established in order to obtain the called party's communication carrier selection, embodiments of the invention may provide an additional communication session option with respect to the called party. For example, the called party may be queried as to whether the current communication session should be terminated in favor of a communication session using a selected carrier or if the current communication session should be maintained and future communication sessions should be established using the selected carrier. In order to facilitate an informed choice to the foregoing query, the user interface may provide information with respect to the advantages and/or disadvantages of the choices. Moreover, because a communication session has already been established, operation of embodiments of the present invention may provide an incentive, such as a reduced rate, free communication time, etcetera, to the called party to continue using the established communication session.

Rather than establishing the communication session and then querying the called party with respect to a communication carrier selection, embodiments of the invention operate to query the called party for a carrier selection via means different than those used in the communication session being initiated. For example, where a calling party is attempting to initiate a telephone call with the called party, embodiments of the present invention may query the called party with respect to a desired communication carrier through a different connection, such as an e-mail or text message.

It should be appreciated that, although the foregoing example of obtaining communication carrier selection from a user has been described with respect to queries made when a communication session is being initiated, the present invention is not limited to a particular time at which the carrier selection may be made. For example, embodiments of the invention may additionally or alternatively query a calling party and/or called party outside of initiation of a communication session (e.g., before and/or after a communication session). According to an embodiment of the invention, users of user terminals 101a-101d may access communication processing system 110 outside of an attempt to establish a communication session therethrough in order to provide user configuration information, such as communication carrier selection, communication type preferences, account information, etcetera. Accordingly, a user may provide preferences with respect to a carrier choice before a communication session is ever initiated. Similarly, a user may provide a carrier selection for future communication sessions after a communication session has terminated. Moreover, a user may provide selections with respect to a plurality of carriers, such as selection of particular carriers for particular types of communications, selection of particular carriers for communication sessions with particular individuals, selection of a particular carrier for communication sessions initiated by the user, selection of a particular carrier for communication sessions directed to the user but initiated by a different user, selection of a primary carrier and a secondary carrier for use if the primary carrier is not available, and/or the like. As with the selections made during the communication initiation, the foregoing preferences are preferably stored by communication processing system 110, such as within database 116, for later use.

Although a user's communication carrier selection is preferably stored for use with respect to a plurality of communication sessions by communication processing system 110, embodiments of the present invention continue to query users with respect to a communication carrier selection when initiating a communication session. Such embodiments facilitate simplified changing of the selected communication carrier by the users. Where the user does not respond to the query, the previously selected carrier may be utilized. Alternatively, once a user has selected a carrier, embodiments of the invention do not further query the user with respect to a preferred carrier, except perhaps upon the occurrence of an event (e.g., the carrier is no longer available, the carrier is no longer willing or able to provide communication services with respect to the user, the carrier is unwilling or unable to provide the particular communication session being initiated by the user, a predetermined amount of time has elapsed since selection of the carrier by the user, etcetera). It should be appreciated that the aforementioned user preferences may include a preference to be queried with respect to a communication carrier choice upon initiation of a communication session.

Of course, even where a user is no longer queried with respect to a carrier selection upon initiating a communication session, embodiments of the present invention provide the ability for a user to select a carrier. For example, the user may access communication processing system 110 outside of an attempt to establish a communication session in order to change the selected communication carrier. Likewise, operation of communication processing system 110 may enable a user to proactively select a communication carrier, such as through entry of a control input sequence, during initiation of a communication session without communication processing system 110 automatically querying the user.

Because embodiments of the present invention provide for both a calling party and a called party to select a carrier for a communication session, embodiments of the invention include a conflict resolution algorithm, such as within carrier selection 113, to arbitrate conflicting carrier selections. For example, a calling party may select a first carrier, whereas a called party may have selected a second carrier. In such a situation, a preferred embodiment of carrier selection 113 operates to determine the party financially responsible for the communication session, the party most likely to pay for the communication session, the party initiating the communication session, the carrier of the carriers selected which meets a particular criteria (e.g., a least expensive carrier, a carrier providing a highest quality service, a carrier having available capacity, and/or the like), etcetera and resolves the conflict by causing communication processing system 110 to utilize the appropriate one of the selected carriers.

Embodiments of the present invention, although operable to allow either a calling party or a called party to select a communication carrier, operate to avoid conflict with respect to carrier selection. For example, to avoid conflict with respect to selection of a communication carrier, embodiments of the present invention operate to query only one of the parties to a particular communication session. For example, carrier selection 113 may operate to determine the party financially responsible for the communication session, the party most likely to pay for the communication session, the party initiating the communication session, the party to which the communication is directed, etcetera and query only that party for a selection of communication carrier. Determining the party for selecting the carrier may be based on various decision criteria which may be different depending upon the particular communication session being initiated, the payment arrangements for the communication session, etcetera. For example, where a collect call is being placed, carrier selection 113 may determine that the called party is to select the communication carrier because the called party will be paying for the communication session.

Alternative embodiments of the invention may operate to typically query one party to select a communication carrier as discussed above, but may occasionally query another party as appropriate. For example, where the party determined to be the appropriate party for selecting the communication carrier has no preference of carriers, embodiments of the invention may then operate to query another party to the communication for a communication carrier selection.

A communication verification procedure that might occur after the above mentioned session validation, and perhaps before placing the communication on links of networks 120a and/or 120b, is a determination concerning the method of payment for the communication services. Some of the methods for paying for the call include a prepaid account credited with a certain amount of money against which the call charges will be debited, alternative call billing (e.g., reversing the call charges (a collect call) or billing the call to a third party), or the use of a controlled environment facility account (e.g., the controlled environment facility may have authorized payment for the call, such as a call to the prisoner's lawyer). If the call is an alternatively billed call, then call processing may make a determination about the probability that appropriate funds may be collected from a responsible party (e.g., the called party or a third party). Details with respect to techniques for determining risk and for initiating and utilizing various accounts in payment for communication processing services are shown and described in the above referenced patent applications entitled "Optimizing Profitability in Business Transactions," "System and Method for Account Establishment and Transaction Management Using Interrupt Messaging," and "Systems and Methods for Transaction Authorization Determination."

According to embodiments of the invention, when communications are made using carrier links other than carrier links provided by the CECSP providing communication processing system 110, billing and collection for the communication links is preferably provided by the selected communication carrier. However, the CECSP may still charge and expect to receive a connection fee, or other fee for providing the services of communication processing system 110. Accordingly, various forms of payment determination and authorization may be implemented by communication processing system 110 in order to assure the CECSP that the services provided by communication processing system 110 will be paid for. In some embodiments, payment for the services provided by communication processing system 110 are collected by the selected communication carrier, such as by a surcharge added to the communication carrier's charge for the communication services.

Communication processing system 110 empowers users to select from a plurality of communication carriers heretofore not possible with respect to controlled environment facility communication services. The carriers from which users may select may include carriers with which a CECSP providing communication processing system 110 has no prior relationship. Accordingly, embodiments of the invention provide risk or debt management services to carriers through operation of risk validation 118. For example, the selected carrier may be responsible for collecting funds in payment for the communication service because the carrier has been selected to provide the communication service. However, the selected carrier may have little information regarding the calling and/or called parties from which to make a credit worthiness determination. Accordingly, embodiments of risk validation 118 operate to provide information regarding the likelihood of receiving payment, such as through a scoring system used with respect to information available through the communication processing system, to the selected carrier for use in determining if the carrier desires to carry the communication. Detail with respect to risk management and scoring is provided in the above referenced patent application entitled "Optimizing Profitability in Business Transactions."

In the foregoing example, the billing model typically employed with respect to controlled environment facility communications is shifted such that the CECSP providing communication processing system 110 is not responsible for collection of fees from the user for the communication service (or all the communication service) and/or is not itself responsible for paying for the communication link utilized. Accordingly, rather than providing for billing and collection of "toll" charges for the communication service, a CECSP providing communication processing system 110 may implement a "connection fee" to receive payment for facilitating the communication session through communication processing system 110 and providing the various control and monitoring features thereof. Such a connection fee may be a single fixed fee, may vary depending upon the features of communication processing system 110 utilized, vary depending upon the particular calling party, called party, controlled environment facility, communication carrier, etcetera.

In order to provide for collection of fees for providing communication services through communication processing system 110, the illustrated embodiment of communication processing system 110 includes transaction billing 113. Transaction billing 113 preferably collects communication detail records, such as calling party information, called party information, controlled environment information, communication carrier information, communication session information, communication processing system feature utilization information, and/or the like, for providing communication service billing. The foregoing information may be continually or periodically processed for issuing billing statements. Such billing statements may be provided directly to users by a CECSP providing communication processing system 110 or may be provided indirectly to the users, such as through the communication carrier user billing statement.

Figure 2:
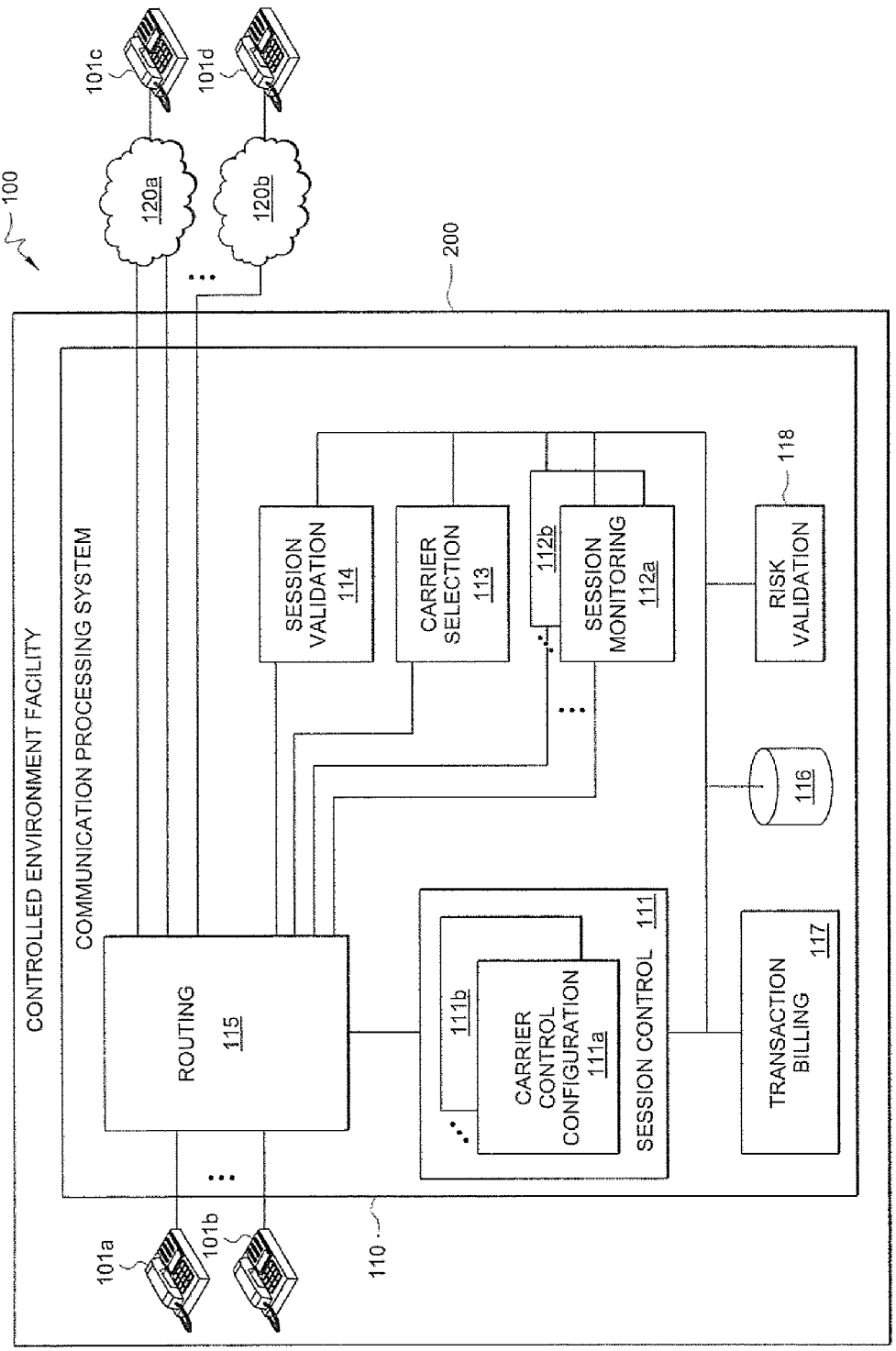
FIG. 2 shows a communication processing system of an embodiment of the present invention deployed in a premise based configuration.

Embodiments of the invention provide a premise based communication processing system (i.e., disposed at a controlled environment facility for which communication processing services are provided) facilitating selection of communication carriers by users. Directing attention to FIG. 2, a premise based implementation of communication processing system 110 is shown. Specifically, communication processing system 110 of FIG. 2 is disposed at controlled environment facility 200 for which communication services are provided. The premise based communication processing system configuration of FIG. 2 provides session validation, carrier selection, and session control and monitoring functionality through a communication processing platform disposed at the controlled environment facility. It should be appreciated that communication processing system 110 of FIG. 2, although disposed at controlled environment facility 200, may utilize information obtained from one or more databases or other systems (e.g., line information database (LIDB), billing telephone number (BTN) registry, etcetera) which are not disposed at controlled environment facility 200, such as may be accessed via a network such as network 120a and/or 120b.

It should be appreciated that, when providing the ability to support multiple communication carriers while providing the communication security and management services useful to a controlled environment facility, communication processing system 110 becomes a somewhat more complicated communication processing platform. For example, as mentioned above, various carrier control configurations 111a-111b and session monitoring 112a-112b are provided according to the illustrated embodiment to facilitate proper operation with respect to a plurality of communication carriers. Accordingly, in a premise based implementation, such as illustrated in FIG. 2, communication processing systems at each controlled environment facility for which a premise based implementation is provided should be upgraded, replaced, or initially deployed to include such multi-carrier features. Costs associated with deploying and maintaining such multi-carrier features at a plurality of controlled environment facilities, particular geographically dispersed facilities, can become prohibitive.

Moreover, in addition to the foregoing multi-carrier features, premise based call processing systems may require appreciable changes in or additions to diagnostic and other management tools to provide satisfactory operation. For example, in an embodiment attempting to provide selection from among a large number of communication carriers can experience situations where a failure with respect to one carrier appears as if a call by call problem has arisen, rather than a carrier failure (e.g., some calls fail due to the particular carrier while other calls are successful). Accordingly, management tools for monitoring the operational state and/or available capacity of the communication carriers which may be selected, as well as diagnostic tools for isolating problems with the communication processing system and the multi-carrier environment may be desired. However, such tools add to the cost and maintenance of the communication processing system, particularly when implemented at each of a large number of premises.

Figure 3:
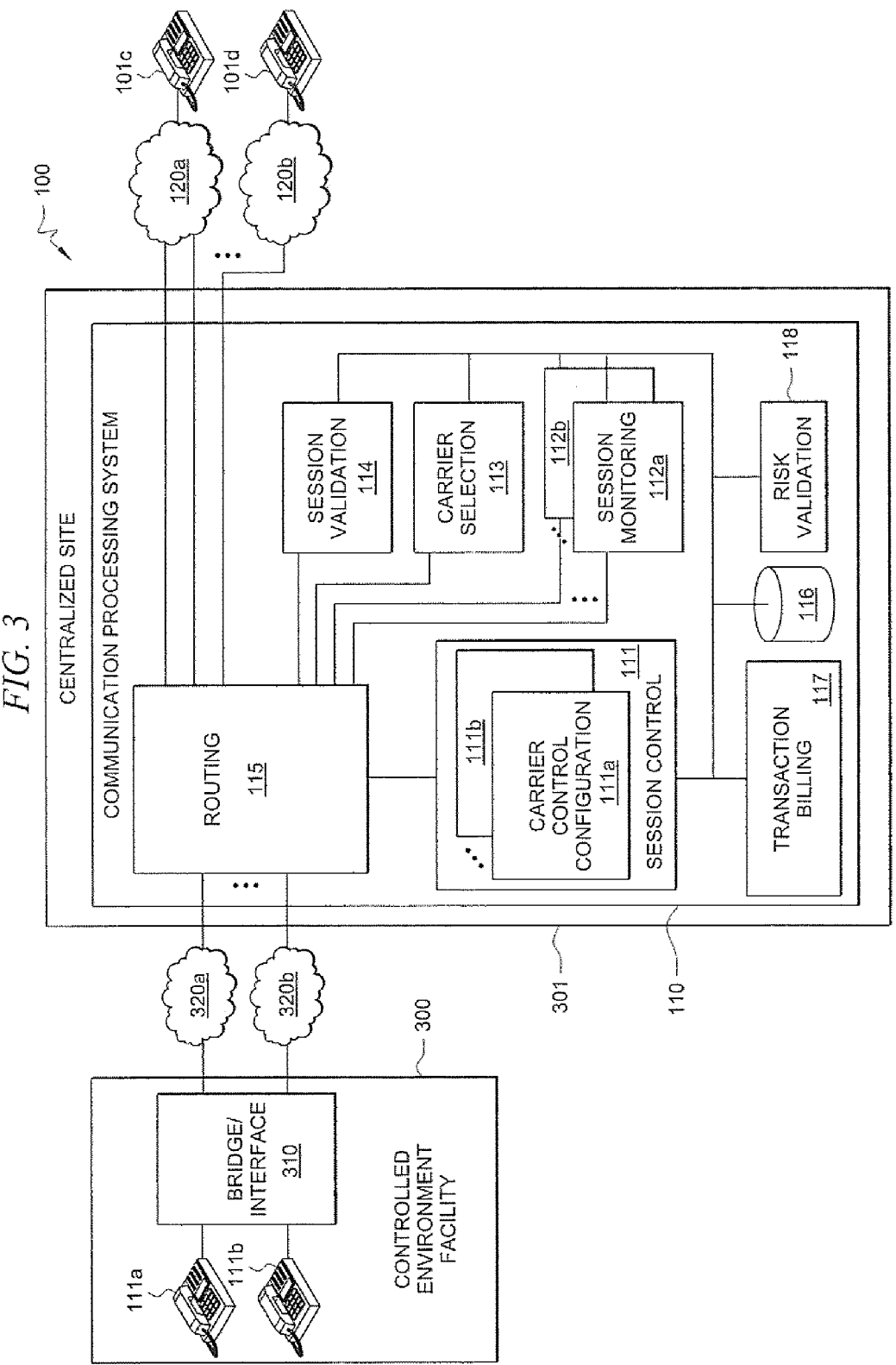
FIG. 3 shows a communication processing system of an embodiment of the present invention deployed in a centralized configuration.

Accordingly, alternative embodiments of the invention provide a centralized communication processing system (e.g., disposed remotely with respect to one or more controlled environment facilities for which communication processing services are provided) facilitating selection of communication carriers by users. Directing attention to FIG. 3, a centralized implementation of communication processing system 110 is shown. Specifically, communication processing system of FIG. 3 is disposed at centralized site 301, which is remote with respect to controlled environment facility 300 for which communication service are provided. In providing a centralized implementation, the embodiment illustrated in FIG. 3 provides network 320a, such as may comprise a switched network (e.g., the PSTN), and/or network 320b, such as may comprise a packet network (e.g., the Internet, a wide area network (WAN), a wireless network, a cable transmission system, etcetera), to couple equipment provided with respect to controlled environment facility 300 (e.g., user terminals 111a-111b) to communication processing system 110. The illustrated network connection is facilitated by bridge/interface 310, such as may comprise a bridge device converting between different communication protocols and/or media, a router for establishing links between controlled environment facility 300 and centralized site 301, an automatic dialer for establishing links between controlled environment facility 300 and centralized site 301, an integrated access device (IAD), and/or the like.

In operation according to a preferred embodiment, when one of user terminals 111a-111b is accessed for use in establishing a communication session, a link is established with communication processing system 110 through bridge/interface 310 and network 320a. Thereafter, communication processing system 110 preferably operates as discussed above. Additional detail with respect to communication processing systems implemented in a centralized configuration is provided in the above referenced patent application entitled "Centralized Call Processing."

Although not shown in FIG. 3, communication processing system 110 therein preferably provides communication processing services with respect to a plurality of controlled environment facilities (e.g., a plurality of controlled environment facilities 300). Accordingly, the centralized communication processing system configuration of FIG. 3 provides session validation, carrier selection, and session control and monitoring functionality through a communication processing platform disposed at one or more centralized sites which preferably provides communication processing services with respect to a plurality of controlled environment facilities. Although the centralized configuration illustrated in FIG. 3 shows only one centralized site 301, embodiments of the present invention may provide a distributed architecture, such as to provide complete communication processing systems at one or more sites for redundancy, load distribution, etcetera, and/or to provide different functionality at different sites. It should be appreciated that communication processing system 110 of FIG. 3, although disposed at a centralized site, may utilize information obtained from a database or other system which is not disposed at centralized site 301, such as may be accessed via a network such as network 120a, 120b, and/or 320a.

In the centralized configuration shown in FIG. 3, the various carrier control configurations 111a-111b and session monitoring 112a-112b provided to facilitate proper operation with respect to a plurality of communication carriers may be shared among a plurality of controlled environment facilities. Moreover, management tools for monitoring the operational state and/or available capacity of the communication carriers which may be selected, as well as diagnostic tools for isolating problems with the communication processing system and the multi-carrier environment, may be shared among a plurality of controlled environment facilities. Accordingly, a centralized implementation, such as illustrated in FIG. 3, provides economies with respect to implementing various features utilized according to embodiments of the invention.

However, some centralized implementations may have disadvantages associated therewith, such as necessitating removal of legacy premise based communication processing systems where such have been previously deployed. Additionally, a single point of failure for all or many communication processing features may be presented by a centralized configuration.

Accordingly, embodiments of the invention provide a distributed configuration comprising a hybrid of the foregoing premise based and centralized configurations. Directing attention to FIG. 4, a hybrid implementation of communication processing system 110 is shown. Specifically, portions of communication processing system 110 are disposed at controlled environment facility 400 whereas other portions of communication processing system 110 are disposed at centralized site 401, which is remote with respect to controlled environment facility 400 for which communication service are provided. The hybrid configuration of FIG. 4 provides various functions, such as session validation, carrier selection, and session control and monitoring, at controlled environment facility 400 and centralized site 401. In providing a hybrid implementation, the embodiment illustrated in FIG. 4 provides network 420a, such as may comprise a switched network (e.g., the PSTN), and/or network 420b, such as may comprise a packet network (e.g., the Internet, a wide area network (WAN), a wireless network, a cable transmission system, etcetera), to couple equipment provided with respect to controlled environment facility 400 (e.g., user terminals 111a-111b, routing 415a, session control 411a, and/or session validation 414a) to portions of communication processing system 110 disposed at centralized site 401.

Although not shown in FIG. 4, the portion of communication processing system 110 disposed at centralized site 401 therein preferably provides communication processing services with respect to a plurality of controlled environment facilities (e.g., a plurality of controlled environment facilities 400). Moreover, although the hybrid configuration illustrated in FIG. 4 shows only one centralized site 401, embodiments of the present invention may provide a further distributed architecture, such as to provide communication processing systems at one or more sites for redundancy, load distribution, etcetera, and/or to provide different functionality at different sites. It should be appreciated that communication processing system 110 of FIG. 3, although disposed at a facility location and centralized site, may utilize information obtained from a database or other system which is not disposed at controlled environment facility 400 or centralized site 401, such as may be accessed via a network such as network 120a, 120b, 420a, and/or 420b.

In operation according to one embodiment, the hybrid communication processing system configuration of FIG. 4 provides at least an initial level of session validation at controlled environment facility 400. For example, before establishing a link between controlled environment facility 400 and centralized site 401 with respect to a particular communication session attempt, session validation 404a and session control 411a operate to make an initial determination as to whether the communication session is to be initiated (e.g., does the resident have communication privileges, is the communication session to terminate at an allowed electronic address). This initial session validation determination may be made using information available at controlled environment facility 400, such as from database 416a. By making an initial session validation attempt at controlled environment facility 400, the unnecessary use of bandwidth in network 420a and/or 420b may be avoided where preliminary session validation indicates the communication session should not be allowed. However, in order to minimize the systems and/or information maintained at each individual controlled environment facility, the level of session validation and/or other session control provided at the controlled environment facility, and thus the information and systems used with respect to such functions, is preferably reduced.

Accordingly, centralized site 401 of the illustrated embodiment includes session control 411b and session validation 414b which may be utilized in making more detailed or more accurate communication session validation determinations. Because the features at centralized site 401 are expected to be utilized by a plurality of controlled environment facilities, the costs associated with deploying, operating, managing, and maintaining more robust features at the centralized site may be distributed over a larger base. Similarly, the various carrier control configuration 111a-111b, session monitoring 112a-112b, etcetera utilized in facilitating selection between a plurality of communication carriers according to the present invention may be distributed over a larger base.

It should be appreciated that, after establishing a link between controlled environment facility 400 and controlled site 401 for initiation of a communication session, operation of carrier control configuration 111a-111b, session monitoring 112a-112b, carrier selection 113 session validation 414b, and routing 415b may be as described above according to embodiments of the invention. That is, the functional blocks of centralized site 401 may provide session validation, carrier selection, and session control and monitoring functionality to establish a communication session between one of user terminals 101a-101b and a select one of user terminals 101c-101d in communication.

The forgoing hybrid configuration provides advantages in that legacy communication processing systems disposed at controlled environment facilities may continue to be utilized, at least to some extent. For example, existing user interface and session validation systems may continue to operate substantially as originally deployed, although upon determining that a communication session is to be allowed, a link may be established with centralized site 401 rather than completing a connection between the user terminals. The functional blocks of centralized site 401 may thus further interact with the communication session initiation attempt, such as to provide more robust session validation and provide carrier selection as described herein. However, the hybrid configuration of the embodiment illustrated in FIG. 4 may result in increased communication costs associated with carrying communication links to and through centralized site 401.

Accordingly, although the embodiment illustrated in FIG. 4 shows user terminals 101c-101d placed in communication with user terminals 101a-101b through centralized site 401, alternative embodiments of the invention may implement a different topology. For example, the functional blocks of centralized site 401 may be in data communication with the functional blocks of controlled environment facility 400 to thereby provide information and control signals. Session control 411a and routing 415a may operate in accordance with such information and control signals to place user terminals 101a-101b in communication with user terminals external to controlled environment facility 400 without the communication link therebetween being provided through centralized site 401. For example, user terminals (not shown) coupled to network 420a and/or 420b may be placed in communication with user terminals 101a-101b by routing 415a using information and/or control signals from centralized site 401.

Although the embodiments illustrated in the figures are shown with a user terminal appearing as a telephone, it should be appreciated that user terminals utilized according to embodiments the present invention may comprise various configurations. For example, user terminals operable with communication processing systems of the present invention may include cellular telephones, personal digital assistants, computer systems, kiosks, etcetera.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   performing, by a communication processing system serving an inmate facility,
   receiving, from a calling party, a selection of a first carrier among a plurality of telecommunication carriers;
   receiving, from a called party, a selection of a second carrier among the plurality of telecommunication carriers, wherein the second carrier is different from the first carrier, and wherein the calling party or the called party is an inmate within the inmate facility;
   designating the first carrier as the selected carrier in response to the calling party having financial responsibility for the telephone call, or designating the second carrier as the selected carrier in response to the called party having financial responsibility for the telephone call;
   identifying the selected carrier as one that provides services compatible with control and monitoring operations performed by the communication processing system in connection with telephone calls made to or from the inmate facility; and
   establishing a telephone call between the calling party and the called party, at least in part, through the selected carrier.

2. The method of claim 1, wherein receiving the selection from at least one of the calling party or the called party comprises retrieving the selection from stored preferences associated with at least one of the calling party or the called party, respectively.

3. The method of claim 1, further comprising:
   performing, by the communication processing system serving the inmate facility,
   identifying the selected carrier as the one between the first and second carriers with lowest cost.

4. The method of claim 1, further comprising:
   performing, by the communication processing system serving the inmate facility,
   identifying the selected carrier as the one between the first and second carriers with highest quality of service.

5. A communication processing system, comprising:
   a processor; and
   a memory coupled to the processor, the memory configured to store program instructions executable by the processor to cause the communication processing system to:
   receive, from a calling party, a choice of a first carrier among a plurality of telecommunications carriers that provide services compatible with control and monitoring operations performed by the communication processing system in connection with an inmate facility;
   receive, from a called party, a choice of a second carrier among the plurality of telecommunication carriers, wherein at least one of the calling or called parties is an inmate within the inmate facility, and wherein the second carrier is different from the first carrier;
   select the first carrier in response to the calling party having financial responsibility for the telephone call or select the second carrier in response to the called party having financial responsibility for the telephone call; and
   establish a telephone call between the calling party and the called party, at least in part, through the selected carrier.

6. The communication processing system of claim 5, wherein to receive the choice of the first carrier from the calling party, the program instructions are further executable by the processor to cause the communication processing system to:
   retrieve the choice of the first carrier from stored preferences.

7. The communication processing system of claim 5, wherein to receive the choice of the first carrier from the called party, the program instructions are further executable by the processor to cause the communication processing system to:
   retrieve the choice of the second carrier from stored preferences.

8. The communication processing system of claim 5, wherein the program instructions are further executable by the processor to cause the communication processing system to:
   select the first or second carrier as the carrier with lowest cost.

9. The communication processing system of claim 5, wherein the program instructions are further executable by the processor to cause the communication processing system to:

select the first or second carrier as the carrier with highest quality of service.

10. A tangible computer-readable storage medium having program instructions stored thereon that, upon execution by a processor within a communication processing system, cause the communication processing system to:
- receive, from a calling party, a choice of a first carrier among a plurality of telecommunication carriers compatible with control and monitoring operations performed by the communication processing system in connection with an inmate facility;
- receive, from a called party, a choice of a second carrier among the plurality of telecommunication carriers, wherein at least one of the calling or called parties is an inmate within the inmate facility, and wherein the second carrier is different from the first carrier;
- select the first carrier in response to the calling party having financial responsibility for the telephone call or select the second carrier in response to the called party having financial responsibility for the telephone call; and
- establish a telephone call between the calling party and the called party, at least in part, through the selected carrier.

11. The method of claim 10, wherein to receive the choice of the first carrier, the program instructions, upon execution by a processor within a communication processing system, cause the communication processing system to: retrieve the choice of the first carrier from stored preferences associated with the calling party.

12. The method of claim 10, wherein to receive the choice of the second carrier, the program instructions, upon execution by a processor within a communication processing system, cause the communication processing system to:
- retrieve the choice of the second carrier from stored preferences associated with the called party.

* * * * *

UNITED STATES PATENT AND TRADEMARK OFFICE
CERTIFICATE OF CORRECTION

| | | |
|---|---|---|
| PATENT NO. | : 8,243,896 B1 | Page 1 of 1 |
| APPLICATION NO. | : 11/753421 | |
| DATED | : August 14, 2012 | |
| INVENTOR(S) | : Robert L. Rae | |

It is certified that error appears in the above-identified patent and that said Letters Patent is hereby corrected as shown below:

On the Title page, [*] Notice: delete "This patent is subject to a terminal disclaimer."

Signed and Sealed this
Sixteenth Day of April, 2013

Teresa Stanek Rea
*Acting Director of the United States Patent and Trademark Office*